Dec. 14, 1965 R. E. BOYDEN 3,223,423

SOUND RECORDING AND REPRODUCING APPARATUS

Filed June 7, 1962 6 Sheets-Sheet 1

INVENTOR.
ROBERT E. BOYDEN
BY
Fred R. Schwend
ATTORNEY

SOUND RECORDING AND REPRODUCING APPARATUS

Filed June 7, 1962 6 Sheets-Sheet 2

INVENTOR.
ROBERT E. BOYDEN
BY
ATTORNEY

Dec. 14, 1965 R. E. BOYDEN 3,223,423

SOUND RECORDING AND REPRODUCING APPARATUS

Filed June 7, 1962 6 Sheets-Sheet 3

INVENTOR.
ROBERT E. BOYDEN
BY
[signature]
ATTORNEY

INVENTOR.
ROBERT E. BOYDEN
BY
[signature]
ATTORNEY

SOUND RECORDING AND REPRODUCING APPARATUS

Filed June 7, 1962

INVENTOR.
ROBERT E. BOYDEN
BY
[signature]
ATTORNEY

INVENTOR.
ROBERT E. BOYDEN
BY
ATTORNEY

United States Patent Office 3,223,423
Patented Dec. 14, 1965

3,223,423
SOUND RECORDING AND REPRODUCING APPARATUS

Robert E. Boyden, 5040 Sereno Drive, Temple City, Calif.

Filed June 7, 1962, Ser. No. 201,728
11 Claims. (Cl. 274—11)

This invention relates to sound recording and reproducing apparatus of the magnetic tape type and has particular reference to recorders and reproducers of the "juke box" type wherein a plurality of recording such as songs or coded digital transcripts are recorded in different tracks and each track is readily accessible from a panel control.

A principal object of the present invention is to provide a sound recording and reproducing apparatus embodying a carrier having a plurality of separate tracks or channels which are accessible individually or automatically from a remote control device.

Another object of the present invention is to provide a sound recording and reproducing device of the above type incorporating an endless magnetic belt contained within an inexpensive magazine which may be readily removed and replaced without losing the initial starting places of any recordings on the belt.

Another object is to facilitate removal and replacement of a magnetic belt in a device of the above type without requiring handling of the belt.

Another object is to facilitate selecting of different channels on a relatively wide magnetic belt having a plurality of channels located in side by side relation thereacross.

Another object is to provide an improved means for recording and reproducing sound from an endless magnetic belt.

Another object is to provide a recording and reproducing apparatus of the above type which may contain a large number of channels and which is simple and economical to manufacture.

The present invention is an improvement over that disclosed and claimed in my copending application Serial No. 39,903, filed June 30, 1960, for "Sound Recording and Reproducing Device," now Patent No. 3,201,525.

The manner in which the above and other objects of the invention are accomplished will be readily understood on reference to the following specification when read in conjunction with the accompanying drawings, wherein:

FIG. 11 is a sectional view, similar to a portion of

Figure 1:
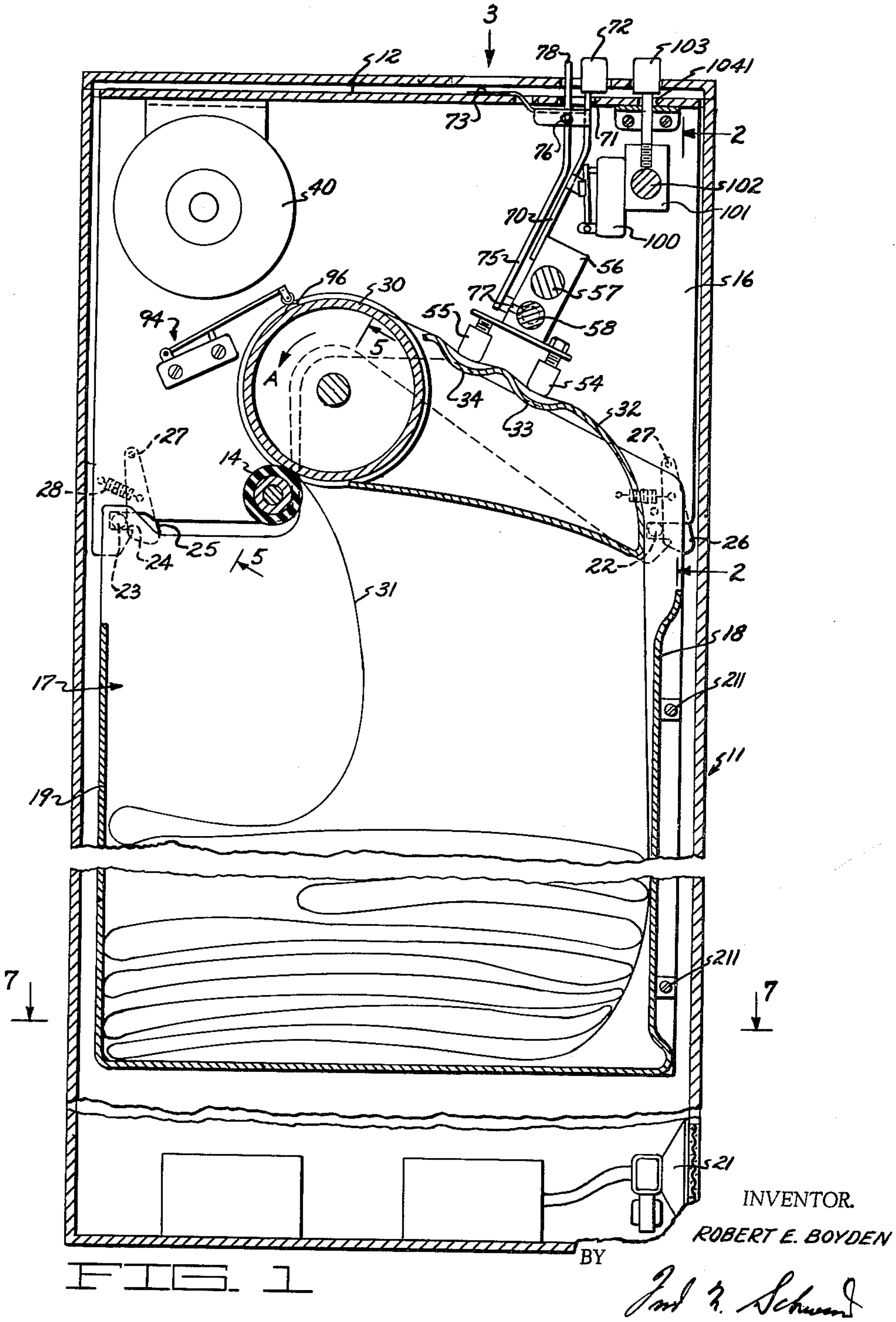
FIG. 1 is a sectional view through a sound recording and reproducing apparatus embodying a preferred form of the present invention.

FIG. 1, but illustrating a modification of the controls of the invention.

Figure 12:
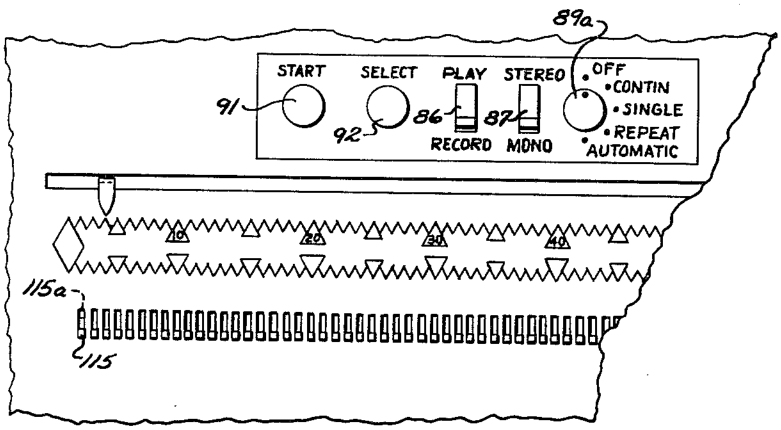

FIG. 12 is a plan view of a part of the control panel incorporated in the modified form of the invention.

Figure 13:
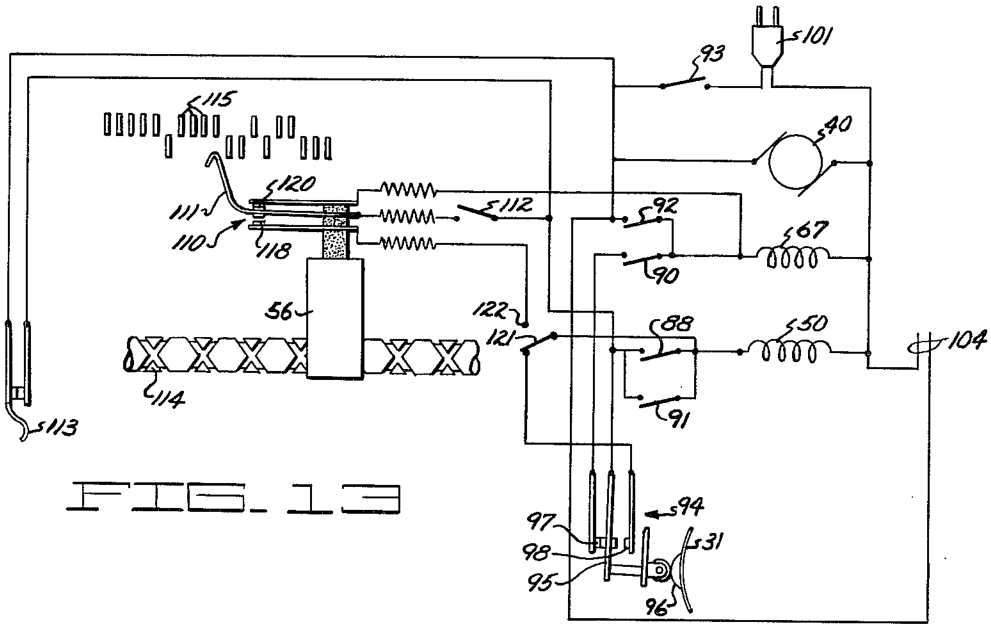

FIG. 13 is a schematic view of part of the wiring circuit for the modified form of the invention.

Figure 2:
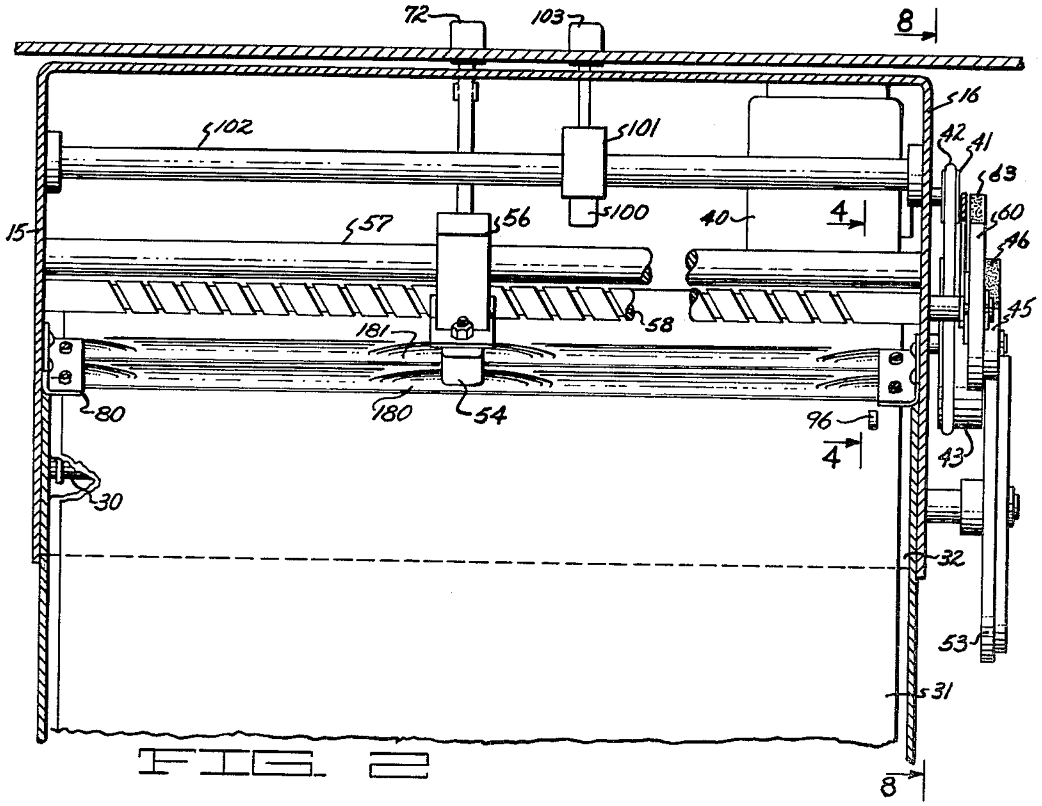
FIG. 2 is a sectional front view taken substantially along the line 2—2 of FIG. 1.
Figure 3:
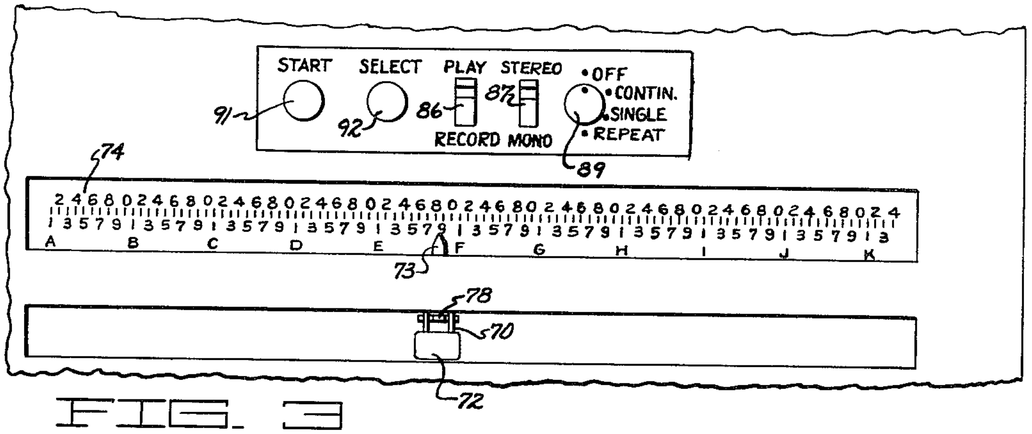
FIG. 3 is a fragmentary plan view taken in the direction of the arrow 3 of FIG. 1.

Referring to FIGS. 1 to 10 in particular, the apparatus comprises a cabinet generally indicated at 11 having a top panel 12 on which various controls for the apparatus, as shown in FIG. 3, are mounted.

A drive unit, including a drive roller 14 having an outer layer of rubber or the like, is mounted in a frame comprising spaced side frame plates 15 and 16 suitably supported in the upper end of the cabinet.

A removable cartridge or magazine unit is provided comprising a container 17 which is removably attached to the lower part of the drive unit. The container comprises front and back walls 18 and 19, respectively, and side walls, one of which is shown at 20, FIG. 7. The rear ends of the side walls are integral with the rear wall 19 but the forward ends of such side walls are attached to the forward wall 18 by screws 211 whereby the forward end of each side wall may be adjusted slightly toward and away from such forward wall.

The side walls of the magazine each has two outwardly extending studs 22 and 23, which, when the magazine is in place, fit in notches 24 formed in the lower ends of the side plates 15 and 16. The magazine is retained in place on each side thereof by retainers 25 and 26 which are each pivoted at 27 and urged clockwise by a spring 28 to retain the associated stud in its supporting notch.

A cylindrical drum 30, preferably of metal, is rotatably mounted in bearings carried at the upper ends of the side walls 20 of the magazine to advance a relatively wide endless magnetic belt 31 of plastic or the like thereover to and from a random stacked arrangement of the belt resting on the floor of the magazine.

The stationary guide 32 of sheet metal extends across the top of the container 17. The latter guide is convexly curved at its forward end to guide the belt thereover and to apply a measured amount of drag to the same. The guide has two indentations 33 and 34 extending thereacross.

The drum 30 is driven by the drive roller 14 which is mounted in bearings carried at the lower ends of the side walls 15 and 16 of the drive unit. When the magazine is in place, the drive roller 14 engages a portion of the belt extending over the drum. The springs 28 act to yieldably maintain the roller in frictional driving engagement with the belt.

Figures 4, 5, 6:
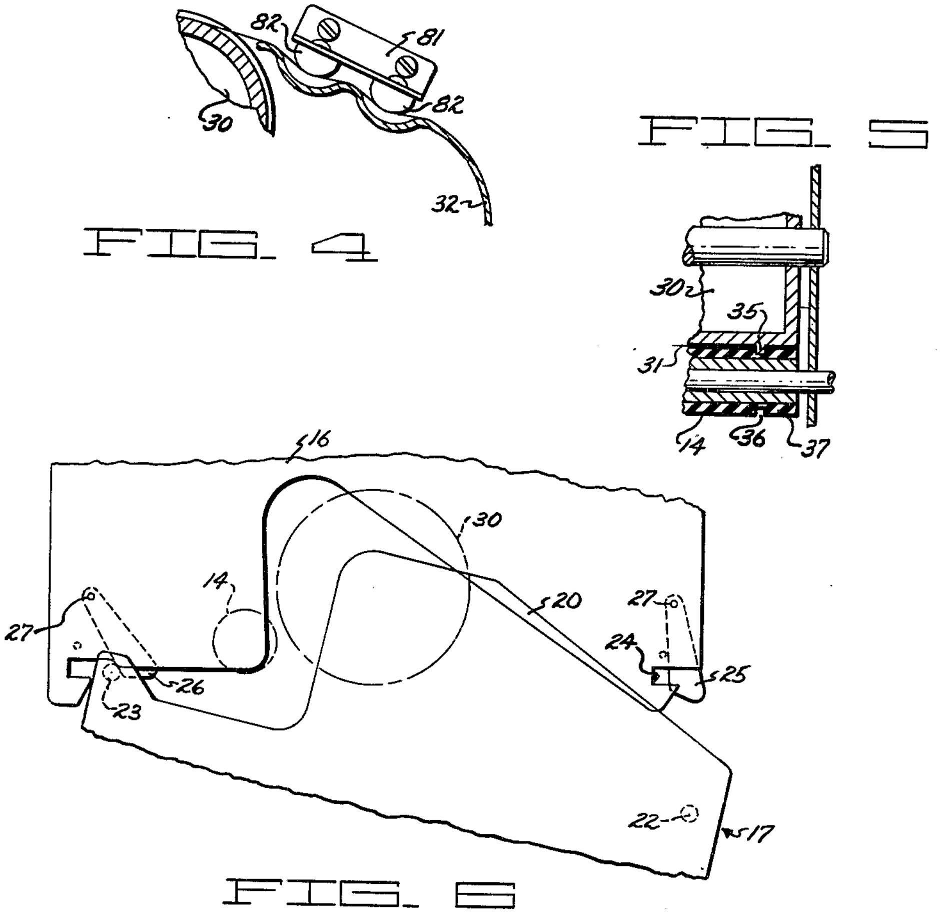
FIG. 4 is a sectional view taken along the line 4—4 of FIG. 2 showing part of the guide arrangement for the belt.
FIG. 5 is a sectional view through part of the belt driving drum and drive roll, and is taken along the line 5—5 of FIG. 1.
FIG. 6 is a side view, of parts broken away, illustrating the locking mechanism for locking the belt magazine to the drive unit.

As shown in FIG. 5, the drum 30 is provided with flanges adjacent opposite ends thereof, one of which is shown at 35, extending into circumferential grooves 36 formed in the roller 14. A portion 37 of the roller extends beyond each flange 35 and directly engages the periphery of the drum to assist in driving the latter. It will be understood that the belt is extremely thin, being on the order of approximately .001 inch thick and is therefore of a membranous character. Thus the resilient layer of the drive roller will yield sufficiently to enable the outer portion 37 to exert a drive on the drum even though the roller is of constant diameter through its length.

The flanges 35 aid in locating the belt on the drum.

It will be noted that the drive roller 14 is located below the center of the drum 30 to effect a maximum "wraparound" of the belt over the drum and to cause the belt to leave the drum as near to the center of the container as possible so that it may properly fold or stack.

Referring to FIG. 6, the magazine is preferably mounted in position by first moving the same upwardly from its position shown, causing the drum 30 to roll over the roller 14 until the studs 22 and 23 fit into their associated slots 24 whereupon the retainers 25 and 26 will retain the studs in place in the slots.

The belt 31 is driven by a motor 40 suitably mounted on the side wall 16 of the drive unit, the shaft of the motor carrying a pulley 41 (FIG. 8) which is entrained through a drive belt 42 with a pulley 43 rotatably mounted on a frame stud 44 and carrying a drive roll 45. An idler roller 46 is carried by an arm 47 fulcrummed at 48 connected by link 49 to the armature of a solenoid 50. A tension spring 51 normally urges the arm counterclockwise to hold a brake element 52 thereon against the periphery of a flywheel unit 53 fixed to the drive roller 14.

Upon energization of the solenoid 50, the arm is rotated clockwise, releasing the brake element from the flywheel and forcing the idler 46 into frictional driving engagement with the roll 45 and the flywheel so as to transmit rotation to the drive roller 14 from the motor.

A read-record head 54 and an erase head 55 are supported above the belt 31 on a head transport 56. The latter is slideably mounted on a fixed shaft 57 extending between the side plates 15 and 16 of the drive unit. The transport is also provided with a bearing slideably fitted over a screw-threaded shaft 58 rotatably mounted in bearings formed in the side walls 15 and 16. The shaft 58 carries a roll 60 and a juxtaposed disc 61 having diametrically opposed notches 62 therein. An idler roller 63 is carried above the pulley 43 and roll 60 by an arm 64 fulcrummed at 65 and connected by link 66 to the armature of a second solenoid 67. A tension spring 68 normally holds the arm 64 clockwise in its illustrated position wherein a roller 69 thereon engages one of the notches 62 in the disc 61 to prevent rotation of the threaded shaft 58. However, when the solenoid 67 is energized the arm will be rocked counterclockwise to remove the stud from engagement with the disc 61 and to force the roller 63 into frictional driving engagement with the pulley 43 and roller 60 so as to transmit rotation from the motor to the threaded shaft.

The transport 56 carries a bracket 70 integral therewith which extends upward through a slot 71 in the panel 12 and terminates in a finger piece 72 whereby the transport may be manually shifted to any position transversely of the belt.

A pointer 73 is formed integrally with the bracket 70 and extends over a scale 74 which has indicia therein indicating by number the different sound channels or tracks on the belt.

A shaft follower 75 is pivotally supported at 76 to a forward extension of the bracket 70 and carries at its lower end a stud 77 normally engaged with the threads of the shaft 58 to form a threaded connection between the shaft and the head transport. A leaf spring 78 normally holds the follower in engagement with the shaft. The pitch of the threads of shaft 58 is such that one half revolution of the shaft will cause the follower to advance the head transport from one track to the next adjacent track. However, a portion of the follower extends upwardly through the slot 71 whereby it may be rocked against the action of the spring 78 to permit manual shifting of the transport in either direction to any desired channel position.

The heads 54 and 55 are located directly above the centers of the indentations or depressions 33 and 34, respectively, and are positioned somewhat below the crests of such indentations as seen in FIG. 1. Thus, as the belt 31 is drawn taut over the guide 32 by the drum 30 (as the latter is rotated in the direction of the arrow A), the belt will be stretched across the indentations and held against sound translating elements on the bottoms of the heads. This insures a consistent and sufficiently yieldable engagement between the belt and such sound translating elements, even though minor variations in the drag on the belt across its width is encountered, and regardless of the positions of the heads across the width of the belt.

As seen in FIG. 2, the heads will cause the belt to slightly depress or bow, as shown at 180 and 181 (FIG. 2), into the depressions 33 and 34 adjacent the heads, and as the heads travel across the width of the belt, such depressed areas of the belt will follow, insuring proper engagement of the belt with the sound translating elements of each head.

In order to help track the belt and retain it in proper relation with the heads 54 and 55 as the latter moves to one end or the other of the belt, deflectors 80 and 81 are mounted on the side walls 15 and 16 of the drive unit. As shown in FIG. 4, each deflector carries a pair of buttons 82 which extend slightly into the depressions 33 and 34 to deflect the edges of the belt into the indentations 33 and 34 to the same extent as the heads 54 and 55 do.

Figure 7:
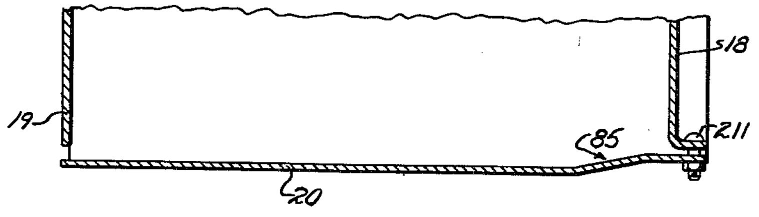
FIG. 7 is a sectional plan view taken along the line 7—7 of FIG. 1.

As mentioned heretofore, the belt 31 is extremely thin and therefore relatively fragile. In order to properly edge guide the same in view of its relatively great width, the side walls 20 of the container are formed as shown in FIG. 7 wherein the forward section of each wall is formed inwardly as indicated at 85. Accordingly, the outer edge of that portion of the belt which is drawn upwardly by the drum 30 is edge guided by wall section 85 while the remainder of the belt, including the stacked portions, is free of edge guiding, allowing the same to assume a free randomly stacked formation without any tendency to bind against the side walls. The screws 211 permit adjustment of the walls 20 to effect proper edged guiding of the belt so that it will not weave or more laterally as it passes over the guide 32.

Figures 8, 9, 10:
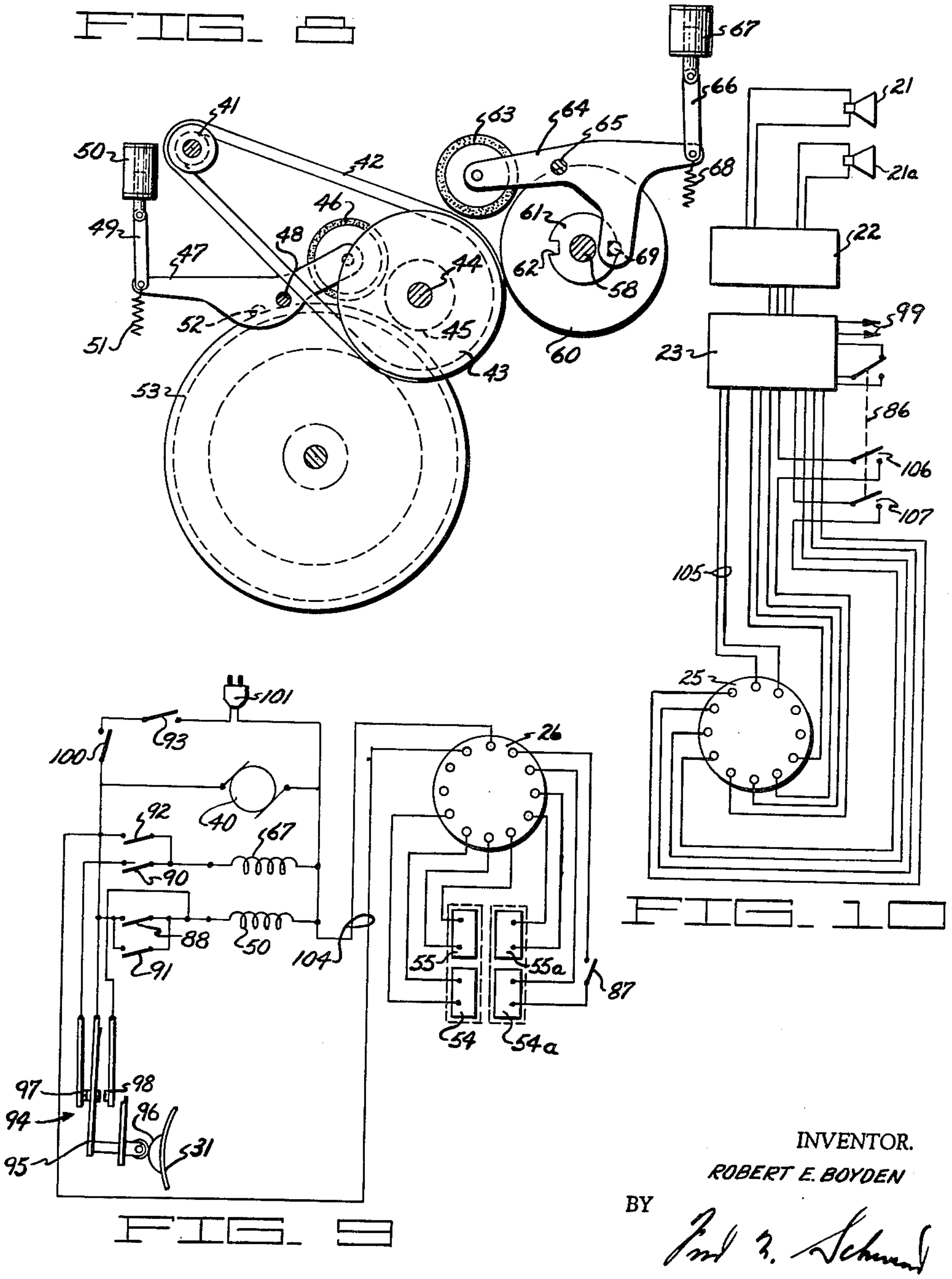
FIG. 8 is a side view of the drive mechanism and is taken substantially along the line 8—8 of FIG. 2.
FIGS. 9 and 10 are schematic views of the wiring circuit for the device.

Referring in particular to FIGS. 3 and 9, the controls include a pushbutton "start" switch 91, a pushbutton "select" switch 92, a settable "play-record" switch 86, a settable "stereo-mono" switch 87 and a multi-purpose switch control knob 89. The latter, when set to "off" opens a switch 93 in the power circuit. When the knob 89 is set to "contin." it closes switches 88 and 90 and when set to "single" it opens switches 88 and 90. When the knob is set to "repeat," it closes switch 88 only.

An additional class C switch generally indicated at 94 (FIGS. 1 and 9) is suitably mounted on the side wall 16 of the drive unit and includes a flexible switch blade 95 electrically connected in series with the switch 93 through a normally closed switch 100. The free ends of the switch blade is operable by a lobe 96, preferably of rubber, which is secured to the belt 31 adjacent one edge thereof. When the belt is in its home position representing the beginning of the recording on each of the channels, the cam lobe 96 will hold the switch blade 95 as shown in FIG. 9 in engagement with a contact 97 electrically connected to one of the contacts of switch 90. When the belt is moved out of home position, the cam lobe permits the switch blade to engage a second contact 98 electrically connected to the solenoid 50 for clutching the belt drum to the motor.

In order to record and reproduce stereo recordings, duplicate read and record heads 54*a* and 55*a* (FIG. 9) may be juxtaposed heads 54 and 55 on the transport 56. These are connected in circuitry shown in FIG. 9.

Assuming, for example, that it is desired to reproduce a single stereo recording and that the transport 56 is properly positioned on a selected pair of channels having stereo recordings of the desired passage, the knob 89 is set to "single" to close switch 93, the switch 86 is set to "play" position as indicated in FIG. 10, the switch 87 is closed by setting its knob to "stereo" and the start key 91 is momentarily depressed. Accordingly, a circuit will be established from a source of current 101, through switch 93, switch 91 and the belt control solenoid 50, thereby causing the latter to effect rotation of the drum and advancement of the belt past the various heads. At this time, the power circuit is established through lines 104, interconnected plug connectors 25 and 26 and lines 105 to circuitry generally indicated at 23 which include amplifier circuits etc. for the various heads. Since the switch 86 is set to "play" the circuit 23 and additional amplifier circuitry 22 will drive loud speakers 21 and 21a under the control of heads 54 and 54a.

As the belt advances, the cam lobe 96 passes from under the switch blade 95 to establish a power circuit through the blade 95, contact 98 and belt control solenoid 50. Accordingly, the belt will continue to be driven through a complete cycle until the cam lobe 96 again engages the blade 95 to break the power circuit.

In the event it is desired to reproduce a single or mono recording, switch 87 is opened so that the head 54 only will be effective to reproduce.

In the event it is desired to record a passage, a suitable microphone and amplifier circuit (not shown) are connected through lines 99 to the circuitry 23. The switch 86 is set to "record," thereby conditioning either of the heads 54 and 54a or both, depending setting of switch 87, to record. Contacts 106 and 107 of the switch 86 are now closed to energize the erase magnets 55 and 55a to erase the preceding recording in advance of the new recording.

When it is desired to select a new channel for recording or reproducing, the "select" switch 92 is closed. Accordingly, a circuit will be completed through the switch 92 to the transport control solenoid 67. The latter will effect transmission from the motor to the shaft 58 to thereby advance the head through one or more channels until the "select" switch 58 is released. When released, if the roller 69 is not aligned with one of the notches 62 on the disc 61, the disc 61 will continue to drive the entrained parts until the next notch 62 passes under the stud at which time the spring 68 will become effective to rock the arm 64 clockwise thereby causing the stud to detent the shaft 58 in a position where heads 54 and 55 are directly over a channel on the belt.

In the event it is desired to automatically repeat reproduction of the same recording any number of times, the knob 89 is set to "repeat," closing switch 88 so as to continually hold the drum control solenoid 50 energized.

In the event it is desired to cause an automatic advancement from one channel to the next after reproducing a first such channel, the knob 89 is set to "cont.," closing both the switches 88 and 90. Thus, after the belt completes its first cycle, the blade 95 is moved to complete a circuit through switch 90 and to transport control solenoid 67 to energize the latter and thereby entrain the screw shaft 58 with the motor. At this time the heads will advance to the next channel and the cam lobe 96 will advance from under the blade 95. The solenoid 50 will be continuously energized so as to continue a reproducing cycle in that new channel. This re-cycling and advancement of the transport to the next succeeding channel will continue until the bracket 70 on the transport 56 engages and opens the normally closed switch 100 (FIGS. 1 and 9) in series with the switch 93. The switch 100 is carried by a transport 101 movable along a rod 102 extending between the side plates 15 and 16 of the drive unit. A handle 103 is attached to the transport and extends through a slot 1041 in the top panel 12, whereby the switch 100 may be manually set into alignment with any channel on the belt. A suitable detent device not shown is effective to detent the transport 101 in any position in which it is set.

Figure 11:
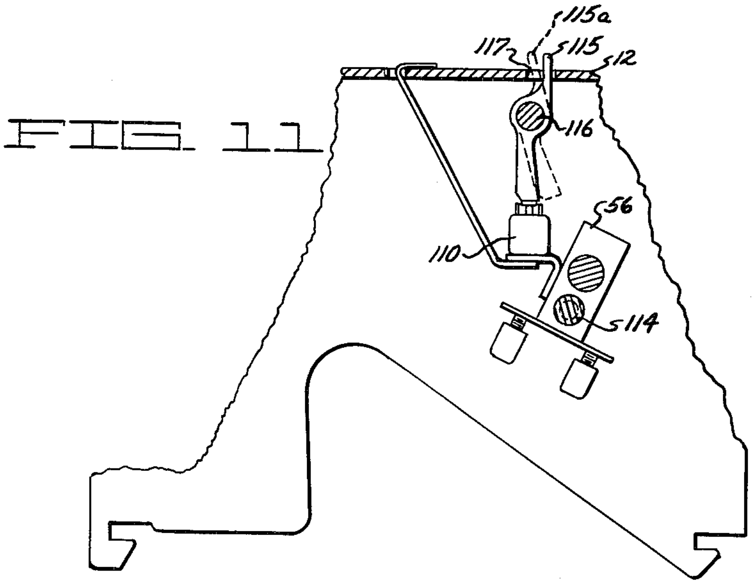

FIGS. 11 to 13 illustrate a modified form of the controls for the apparatus wherein any ones of the different channels may be preselected to be automatically and sequentially reproduced.

Elements similar to those disclosed in FIGS. 1 to 10 are indicated by similar reference numbers.

In this case, a class C switch 110 (FIGS. 11 and 13) is mounted on the head transport 56. The flexible blade 111 of such switch is connected through a settable switch 112 to the flexible blade 95 of belt controlled switch 94.

A normally closed limit switch 113 is located at the left of the transport 56 and is connected in series between the switches 93 and 112.

The transport 56 is mounted on a screw threaded shaft 114 which is similar to shaft 58 and driven similarly except that it is threaded in reverse directions in a manner similar to that shown in my copending application, Serial No. 39,903, so as to advance the transport in opposite directions. That is, when the transport is advanced to the right hand limit of its travel it will be automatically advanced to the left. As the transport reaches its left hand limit it opens limit switch 113.

The blade 111 cooperates with a series of settable control levers 115 independently and pivotally mounted on a rod 116 extending between the side plates 15 and 16 of the drive unit. One lever 115 is provided for each channel on the belt, the levers being movable in slots 117 in the top panel 12. Each lever 115 is alternately settable into its full line control position of FIG. 11 wherein it is effective to cam the blade 111 into electrical contact with switch contact 118 or into its dotted line position 115a wherein it is ineffective to cam the switch blade. In its normal position blade 111 engages contact 120 to establish a circuit from switch 112 to the transport control solenoid 67.

A double throw switch 121 is provided which, when the control knob 89a is set in "Continuous," "Single" and "Repeat" settings, is retained in its illustrated position connecting the contact 98 in circuit with the belt control solenoid 50. However, when the knob 89a is set in "Automatic," the switch is thrown to engage the switch blade with contact 122 thereby connecting switch contact 118 with the solenoid 50. Also, when the knob 89a is set in "Automatic" switches 90, 93 and 112 are closed. Accordingly, a circuit is completed from the power supply, through switches 93, 113, 112, blade 111, contact 120 and transport control solenoid 67 to effect a shift in the appropriate direction until the blade 111 engages a lever 115 which has been set in its control position. Now, a circuit is completed through switches 93, 113, 112, blade 111, contacts 118, 122, switch 121 and belt control solenoid 50 to effect a belt cycle in the corresponding channel. At the end of such cycle, the lobe 96 throws the switch blade 95 into engagement with contact 97 to complete a circuit through the transport control solenoid to shift the heads out of the current channel. If the next lever 115 is in its control position the transport will stop at the next channel and a reproduction or recording cycle will again automatically commence. If such lever is out of its control position, the switchblade 111 will again engage contact 118 to effect shifting of the transport until the next lever 115 is reached which has been set into its control position. This continued cycling and shift will continue until the heads are returned to their leftmost positions wherein the limit switch 113 will be opened or until the knob 89a is set into another position.

When the knob 89a is set into "Repeat" position, switches 88 and 93 are closed and switch 121 is set in its illustrated position causing repeated cycling in a selected channel.

Although I prefer to employ a magnetic belt having a width on the order of 12 to 18 inches, I consider any such belt of approximately 4 inches or more in width as being relatively wide under the terms set forth in the appended claims.

Having thus described the invention, what I desire to secure by United States Letters Patent is:

1. Sound translating apparatus comprising a relatively wide magnetic belt, a sound translating head, a rotatable member for driving said belt past said head, a drive control member, means pivotally supporting said drive control member adjacent said rotatable member, a rotatable drive element supported by said drive control member on one side of said pivotal support, a braking element supported by said drive control member on the opposite side of said pivotal support, and means for alternately rocking said drive control member in one direction to engage said drive element with said rotatable member whereby to drive said rotatable member and for rocking said drive control member in the opposite direction whereby to cause said braking element to brake said rotatable member.

2. Sound translating apparatus comprising a container, a belt supporting roller, means in said container supporting said roller adjacent the top of said container for rotation about a horizontal axis, an endless membranous magnetic belt wrapped over a least a portion of said roller and extending into said container, a drive unit including a sound translating device cooperable with said belt, a drive roller, and motor means for rotating said drive roller; and means for removably attaching said container to said drive unit, said attaching means maintaining said drive roller in frictional driving engagement with a portion of said belt which is wrapped over said supporting roller, said container having opposite sides, said sides having edge guiding portions arranged in edge guiding relation with portions of said belt being drawn from said container over said supporting roller, said edge guiding portions being spaced from said supporting roller, and the remainder of said sides being out of edge guiding relation with said belt.

3. Sound translating apparatus according to claim 2 comprising means for adjusting said edge guiding portions of said sides whereby to adjust the path of said belt.

4. Sound translating apparatus comprising a wide endless magnetic belt, a sound translating device cooperable with said belt, means for advancing said belt past said translating device, means for advancing said translating device along said belt at right angles to the path of movement of said belt and into any of a plurality of sound translating positions, a plurality of settable members, one for each of said translating device positions, means movable with said translating device for controlling said belt advancing means and said translating device advancing means in accordance with the setting of said settable members, and selectively settable means for preventing said last mentioned means from controlling said translating device advancing means.

5. Sound translating apparatus comprising a relatively wide magnetic belt, a sound translating head, a rotatable member for driving said belt past said head, a drive control member, means supporting said drive control member for movement into either of two positions, a rotatable drive member supported by said drive control member, a braking element supported by said drive control member, means for moving said drive control member into one of said positions to engage said drive element with said rotatable member whereby to drive said rotatable member, and means for moving said drive control member into the other of its positions to engage said braking element with said rotatable member whereby to cause said braking element to brake said rotatable member.

6. Sound translating apparatus comprising an endless magnetic belt, the sound translating device cooperable with said belt, means for advancing said belt past said translating device, means for advancing said translating device along said belt at right angles to the path of movement of said belt and into any of a plurality of sound translating positions, a plurality of settable members, one for each of said translating positions, means movable with said translating device for controlling said belt advancing means and said translating device advancing means in accordance with the setting of said settable members, and selectively settable means for causing said translating device advancing means to advance said translating device from one of said translating positions to a next upon each advancement of said belt past said translating device regardless of the setting of said settable member.

7. Sound translating apparatus according to claim 6 comprising means for selectively disabling said translating device advancing means.

8. Sound translating apparatus according to claim 6 comprising means for selectively and concurrently disabling said belt advancing means and for causing operation of said translating device advancing means.

9. In a sound translating apparatus, a multiple channel magnetic tape recording medium, a sound translating head and an erasing head movable into alignment with any of said channels; a position indicator to show the respective channel position of said heads, an automatic drive means for said heads operable to drive from channel to channel, means related with each said channel comprising individually settable stops to control the movement of said heads to start and stop at each said channel; manual means to uncouple said heads from said driving means and to position said heads to any said channel, and control means settable to enable or disable said automatic drive means for said heads.

10. A sound translating device comprising a thin wide, multichannel endless magnetic tape recording medium, a sound translating head movable to cooperate with any said channel, a drive means for said head, a drive means for said tape, indicating means for said head to show its respective channel positions, a container for said tape, said container supporting a portion of said first mentioned drive means, guiding means in said container for edge guiding said tape, said guiding means being adjustable to control the path of said tape, means for removing said container from said device, and means for accurately relocating said container relative to said device.

11. A sound translating device according to claim 10 comprising means on said tape for effecting starting and stopping of said second mentioned tape drive means.

References Cited by the Examiner

UNITED STATES PATENTS

| | | | |
|---|---|---|---|
| 2,782,041 | 2/1957 | Muller | 274—11 |
| 2,821,576 | 1/1958 | Gaubert | 179—100.2 |
| 2,856,463 | 10/1958 | Lyon | 179—100.2 |
| 2,897,287 | 7/1959 | Lyon | 179—100.2 |
| 2,899,507 | 8/1959 | Martel | 179—100.2 |
| 2,908,767 | 10/1959 | Fritzinger | 179—100.2 |
| 2,944,116 | 7/1960 | Vershovew | 179—100.2 |

NORTON ANSHER, *Primary Examiner.*

BERNARD KONICK, *Examiner.*